United States Patent
Yates et al.

(10) Patent No.: US 7,608,133 B2
(45) Date of Patent: Oct. 27, 2009

(54) LITHIUM-EXCHANGED FAUJASITES FOR CARBON DIOXIDE REMOVAL

(75) Inventors: Stephen F. Yates, Arlington Heights, IL (US); Allen A. MacKnight, Signal Hill, CA (US)

(73) Assignee: Honeywell International Inc., Morristown, NJ (US)

( * ) Notice: Subject to any disclaimer, the term of this patent is extended or adjusted under 35 U.S.C. 154(b) by 590 days.

(21) Appl. No.: 11/383,589

(22) Filed: May 16, 2006

(65) Prior Publication Data

US 2007/0199448 A1 Aug. 30, 2007

Related U.S. Application Data

(60) Provisional application No. 60/777,468, filed on Feb. 27, 2006.

(51) Int. Cl.
*B01D 59/26* (2006.01)
(52) U.S. Cl. .............................. 95/95; 95/139; 95/148
(58) Field of Classification Search ............ 95/95, 95/96, 139, 148
See application file for complete search history.

(56) References Cited

U.S. PATENT DOCUMENTS

| | | | |
|---|---|---|---|
| 4,859,217 A | 8/1989 | Chao | |
| 5,531,808 A * | 7/1996 | Ojo et al. .................. | 95/96 |
| 5,912,422 A | 6/1999 | Bomard et al. | |
| 6,143,057 A * | 11/2000 | Bulow et al. .................. | 95/96 |
| 6,238,460 B1 | 5/2001 | Deng et al. | |
| 6,451,723 B1 | 9/2002 | Gaita et al. | |
| 6,585,810 B1 | 7/2003 | Gaita et al. | |
| 6,824,590 B2 | 11/2004 | Dee et al. | |
| 6,913,638 B2 | 7/2005 | Sumida et al. | |
| 2005/0257686 A1 | 11/2005 | Occhialini et al. | |

OTHER PUBLICATIONS

Brandani, F. et al. "Measurement of Adsorption Equilibrium by the Zero Length Column (ZLC) Technique Part 1: Single-Component Systems", (2003) Ind. Eng. Chem. Res. 42: 1451-1461.
Brandini, F. et al. "The Effect of Water on the Adsorption of CO2 and C3H8 on Type X Zeolites", (2004) Ind. Eng. Chem. Res. 43: 8339-8344.
Yates, S.F. et al. "Modified X Zeolites as Next Generation Carbon Dioxide Adsorbents", (2006) SAE International Paper 06ICES-136.
Kay, R., "International Space Station (ISS) Carbon Dioxide Removal Assembly (CDRA) Protoflight Performance Testing" (1998) SAE International Technical Paper 981622.

* cited by examiner

*Primary Examiner*—Robert A Hopkins
(74) *Attorney, Agent, or Firm*—Oral Caglar, Esq.

(57) ABSTRACT

A process for removal of carbon dioxide from air using lithium-exchanged X-zeolites at low carbon dioxide partial pressures is provided. The process is particularly useful in applications where fresh air is not available and exhaled air needs to be recycled. An apparatus for carrying out the process is also provided.

17 Claims, 5 Drawing Sheets

LITHIUM-EXCHANGED FAUJASITES FOR CARBON DIOXIDE REMOVAL

CROSS-REFERENCE TO RELATED APPLICATIONS

The present application claims priority to Provisional Patent Application Ser. No. 60/777,468 filed on Feb. 27, 2006.

BACKGROUND OF THE INVENTION

The present invention relates generally to methods for removing carbon dioxide from a gaseous mixture and more specifically to methods for removing carbon dioxide from air using lithium-exchanged faujasites.

Zeolite adsorbents for carbon dioxide removal from air have been a critical element of both the Skylab Regenerative Carbon Dioxide Removal System (RCRS) and the International Space Station (ISS) Carbon Dioxide Removal Assembly (CDRA). These adsorbents selectively separate carbon dioxide from air using either pressure swing (Skylab) or combined pressure swing/thermal swing (ISS) methodologies. The isotherm curves describing carbon dioxide uptake at various partial pressures are key determiners of the overall size and weight of an adsorbent-based system. The carbon dioxide adsorbent utilized in the ISS CDRA is a modified 5A zeolite first developed by AlliedSignal (now Honeywell) in the 1980's.

The size and configuration of the desiccant and carbon dioxide adsorbent beds are selected to optimize the system's performance. With respect to system performance, the key characteristics include carbon dioxide removal rate as a partial pressure function, system mass, and system power consumption. These key system requirements are utilized to develop the desiccant and adsorbent bed cycle times, process air flow rates, and regeneration temperatures.

The capacity of the adsorbent at the required carbon dioxide partial pressure is a key design parameter that determines the configuration and size of the beds. ASRT 5A, an improved version of the basic 5A zeolite, was developed for space applications. Its key advantage lies in its higher capacity at similar carbon dioxide partial pressures. In any aerospace application, component size and weight are crucial factors that determine the success of the technology. Therefore, any system that may be reduced in size or weight, especially in aerospace applications, is a significant achievement. Currently, carbon dioxide removal in the International Space Station uses a modified 5A sodium zeolite as the carbon dioxide adsorbent. Newer space missions, however, will require even higher performance, while minimizing the size, weight, power consumption, and waste heat emission.

As can be seen, there is a need for a high-performance carbon dioxide adsorbent with a large capacity for carbon dioxide during the adsorption portion, but also, a low capacity for carbon dioxide during regeneration. Such an adsorbent should minimize the size, weight, power consumption and waste heat emissions of a carbon dioxide removal system in which it is used.

SUMMARY OF THE INVENTION

In one aspect of the present invention there is provided a process for removing carbon dioxide from a gas comprising the step of feeding a stream of gas through an adsorbent bed at a partial pressure of less than about 10 torr to yield a carbon dioxide depleted gas, the adsorbent bed comprising a lithium-exchanged zeolite.

In another aspect of the present invention there is provided a process for removing carbon dioxide from air comprising the steps of feeding a stream of air through an adsorbent bed at a partial pressure of less than about 10 torr to yield carbon dioxide depleted air, the adsorbent bed comprising a lithium-exchanged zeolite; and regenerating the adsorbent bed when it becomes saturated.

In a further aspect of the present invention there is provided a process for removing carbon dioxide from air comprising the steps of: feeding the air through a desiccant bed to yield dry air; and feeding the dry air through an adsorbent bed at a carbon-dioxide partial pressure of from about 0.1 torr to about 1 torr to yield carbon dioxide depleted air, the adsorbent bed comprising a lithium-exchanged X-zeolite These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a process for removing carbon dioxide from air using a lithium-exchanged faujasite where the carbon dioxide has a low partial pressure. The air may be a carbon dioxide enriched air such as, but not limited to, exhaled air. The present invention is useful for any application where carbon dioxide needs to be removed from air. Non-limiting examples may be in aerospace, particularly a long-term application such as the international space station.

Currently, a modified calcium-exchanged A-zeolite (ASRT 5A) is being used for a carbon dioxide removal apparatus on the International Space Station. The present invention uses a lithium-exchanged X-zeolite having a higher capacity for carbon dioxide at similar pressures, therefore requiring smaller and lighter adsorbent beds for removing carbon dioxide from air. It has also been found that lithium-exchanged X-zeolites have a greater capacity and are more selective for carbon dioxide than for nitrogen. The processes of the prior art have used lithium-exchanged zeolites for removing nitrogen for producing either pure nitrogen gas or for applications where nitrogen removal was required to purify air. These processes operated above ambient temperature and pressure where nitrogen is effectively adsorbed by lithium-exchanged X-zeolites. For example, U.S. Pat. No. 6,824,590 describes a process for producing pure oxygen or nitrogen from air by using lithium-exchanged X-zeolite adsorbent. The '590 patent also discloses that, under the conditions used, at high carbon dioxide loading the heat of adsorption for carbon dioxide is significantly lower than nitrogen, resulting in the selective adsorption of nitrogen over carbon dioxide. Therefore, the method of the '590 patent produces a nitrogen depleted product, preferably pure oxygen. The present invention seeks to remove carbon dioxide selectively without changing the air composition through a process operating at ambient temperature and pressure where carbon dioxide is preferentially adsorbed. Moreover, with the present invention the nitrogen content of the carbon-dioxide depleted air is about the same as for the initial, unprocessed air.

Figure 1:
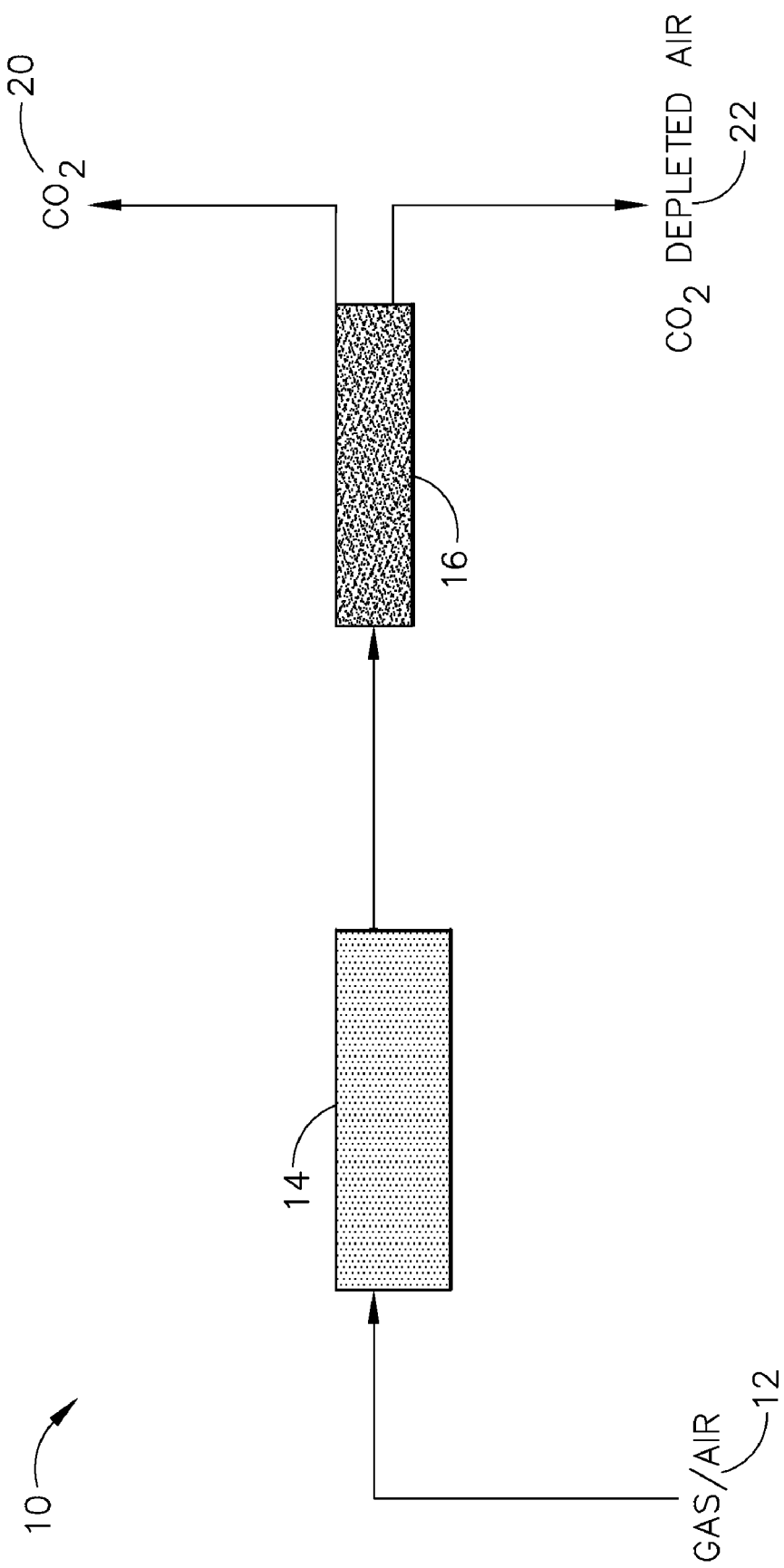
FIG. 1 is a schematic showing a process for removing carbon dioxide from carbon dioxide-enriched air, according to the present invention.

Referring to FIG. 1, there is shown a simplified schematic of a process 10 of the present invention for removing carbon dioxide from a gas or air 12 (hereafter referred to simply as "air"). Air 12 may be fed through an adsorbent bed 16 capable of selectively adsorbing carbon dioxide to form carbon dioxide depleted air 22. If air 12 has a significant water vapor content, it may be fed through a desiccant bed 14 prior to being fed through adsorbent bed 16 to remove water vapor that may be preferentially adsorbed by the adsorbent. After adsorbent bed 16 becomes saturated, it may be regenerated by a desorption process such as, but not limited to, temperature swing desorption, pressure swing desorption or a combination of both. Adsorbent bed 16 temperature may be raised and/or the pressure may be decreased, releasing the adsorbed carbon dioxide 20 from adsorbent bed 16. A sweep gas without carbon dioxide present may be used in addition to the heat and/or reduced pressure to further aid the desorption. Likewise, if desiccant bed 14 is also being used, it may also be regenerated.

The air 12 may be any air or gas stream that contains an amount of carbon dioxide that makes the air or gas unsuitable for its intended use. For example, air 12 may be exhaled air from human beings or other mammals which contains a higher amount of carbon dioxide than inhaled air. The carbon dioxide may be removed from the exhaled air to produce air that is suitable to be inhaled. Table 1 gives a comparison of the amount of oxygen, nitrogen and carbon dioxide present in both exhaled and inhaled air. This may be critical in applications such as a space station where air must be recycled.

TABLE 1

Composition of Air During Breathing

| Gas | Partial Pressure (torr) | |
|---|---|---|
| | Inhaled Air | Exhaled Air |
| Nitrogen | 594.7 | 569 |
| Oxygen | 160 | 116 |
| Carbon Dioxide | 0.3 | 28 |

The air 12 may be fed into adsorbent bed 16 at a linear velocity that provides the desired rate of adsorption of carbon dioxide. The linear velocity may be, but not limited to, from about 1.95 cm/sec to about 7.80 cm/sec, or alternatively, a space velocity of about 16.90 $sec^{-1}$ to about 67.58 $sec^{-1}$.

Adsorbent bed 16 may comprise an adsorbent capable of selectively adsorbing carbon dioxide. The adsorbent may be, but not limited to, sodium-, potassium- or lithium-exchanged zeolites. Zeolites are crystalline aluminosilicates with defined open crystal structures. Faujasites (X and Y zeolites) and A zeolites are two common structures, both of which are associated with carbon dioxide adsorption. The relative affinity of these adsorbents to carbon dioxide or other adsorbates may be modulated using ion exchange to replace the parent cations in the structure, frequently sodium, with various others. Use of alternative cations may affect the pore dimensions into the open zeolite structure, and may also affect the relative affinity of different adsorbates. Lithium-exchanged zeolites, particularly lithium-exchanged X-zeolites, may have a higher capacity for carbon dioxide than other adsorbents, particularly at lower partial pressures, making them desirable to use in space applications where the partial pressures may be lower and weight and size of a carbon dioxide removal assembly are a consideration.

Figure 2:
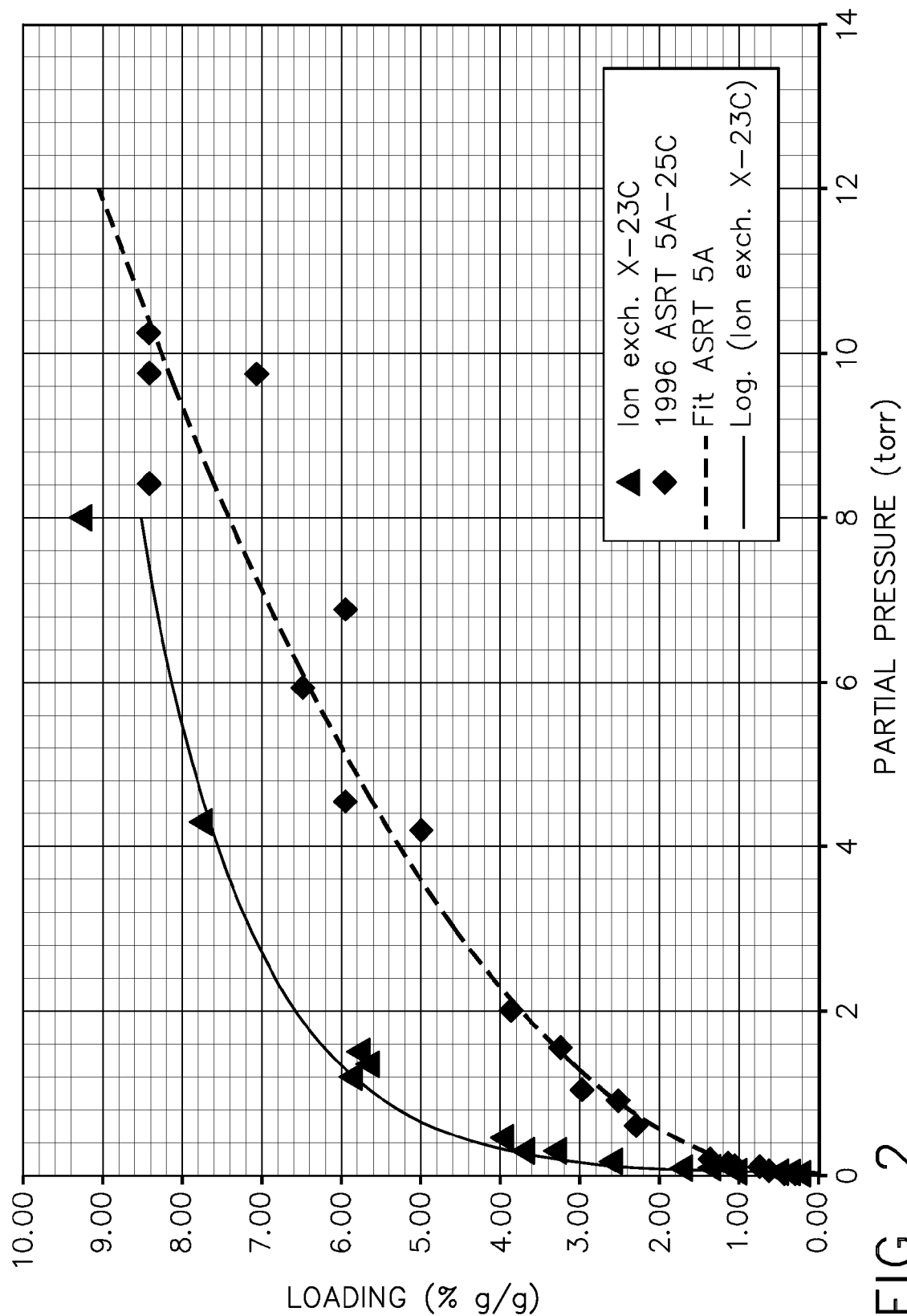
FIG. 2 is a graph showing the carbon dioxide adsorption isotherms for lithium-exchanged X-zeolite and ASRT 5A, according to the present invention.

Referring to FIG. 2, lithium-exchanged X-zeolite (triangles) may have a greater affinity for carbon dioxide at partial pressures less than 10 torr as compared to the calcium-exchanged A zeolite (ASRT 5A) (diamonds) which is currently in use for space applications. Lithium-exchanged X-zeolite may have an even higher capacity through the range between 0.1 and 10 torr, but may have decreasing capacity at the very lowest partial pressures. The partial pressure of carbon dioxide in the ISS cabin may nominally range between 2.0 to 3.9 torr, and at these partial pressures, the increase in capacity between lithium-exchanged X-zeolite and ASRT 5A ranges from a factor of 1.7 to 1.5. This may be a very significant change, affecting the overall size and weight of an air revitalization unit.

The lithium-exchanged X-zeolite may be any of a variety of forms known to those skilled in the art. Non-limiting examples may be clay-bound beads or polymer composites. Lithium-exchanged X-zeolite polymer composites may be made by the processes of U.S. Pat. Nos. 6,585,810 and 6,451,723 and U.S. patent application Ser. No. 11/375,415, all hereby incorporated by reference in their entirety. Adsorbent bed 16 may comprise packed beds of pellets or spherical beads. Alternatively, adsorbent bed 16 may comprise powdered zeolite in a porous polymer-bound molded unit, for example, as disclosed in the '810 and '723 patents. A coating of the powdered zeolite onto metal surfaces may also be used.

Figure 3:
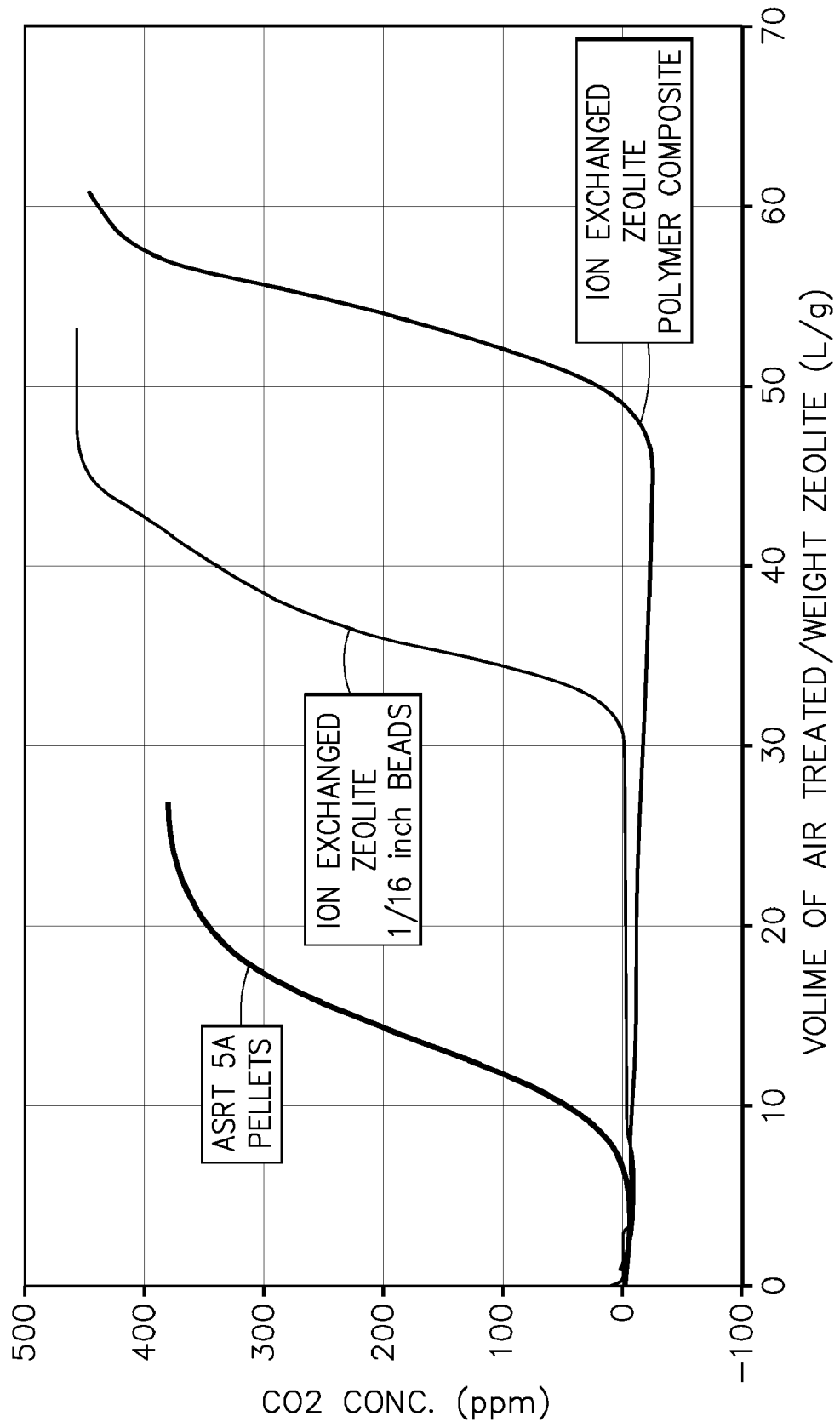
FIG. 3 is a graph showing the breakthrough curves for ASRT 5A pellets, lithium-exchanged X-zeolite beads and lithium-exchanged X-zeolite polymer composite, according to the present invention.

Lithium-exchanged X-zeolite polymer composites may be more stable as they may be less apt to generate fines due to shaking or other mechanical stresses as well as having a higher capacity for carbon dioxide than the clay-bound bead form. This is illustrated in FIG. 3 for sodium-exchanged zeolite pellets (ASRT 5A), lithium-exchanged X-zeolite beads and lithium-exchanged X-zeolite polymer composite. The breakthrough curves of FIG. 3 show the volume of air treated per volume of zeolite adsorbent before carbon dioxide is detected in the treated air. The partial pressure of the carbon dioxide was about 0.3 torr. Both forms of the lithium-exchanged X-zeolites have a significantly higher capacity for carbon dioxide than the sodium- or calcium-exchanged zeolites. Moreover, the lithium-exchanged X-zeolite polymer composite has at least a 50% increase in the amount of carbon dioxide adsorbed as compared to the lithium-exchanged X-zeolite beads. The polymer composites may also be more readily regenerated resulting in longer lifetimes, enabling them to be in service longer before they need to be replaced.

Figure 4:
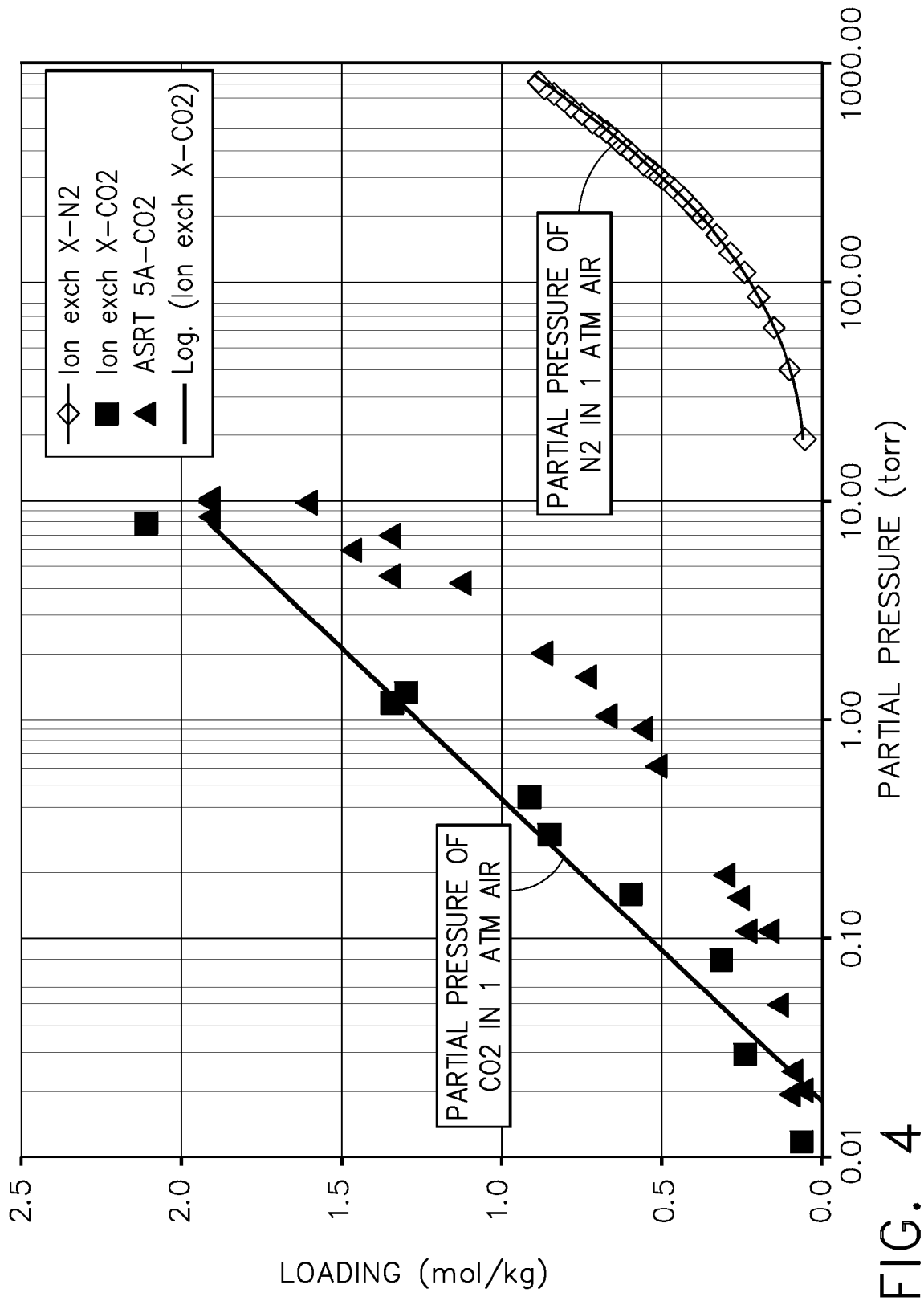
FIG. 4 is a graph showing the adsorption isotherms for lithium-exchanged X-zeolite (carbon dioxide and nitrogen) and ASRT 5A (carbon dioxide), according to the present invention.

The process 10 of the present invention may be carried out at lower partial pressures of carbon dioxide, for example, less than 10 torr. Alternatively, process 10 may be carried out with carbon dioxide partial pressures less than 1 torr or in a pressure range of from about 0.1 torr to about 1 torr. Lithium-exchanged X-zeolites have been used extensively in the prior art for adsorbing nitrogen from a gas or air stream. At ambient temperature and pressure, i.e. 760 torr, the partial pressure of nitrogen is about 600 torr compared to less than 1 torr for carbon dioxide. As shown in FIG. 4, the lithium-exchanged X-zeolite may adsorb very little nitrogen under atmospheric conditions as compared to carbon dioxide. For applications such as the ISS, the amount of nitrogen in the air should remain unchanged (Table 1). Any nitrogen that is adsorbed may be displaced by carbon dioxide since the adsorbent may have a higher affinity for the carbon dioxide.

When the breakthrough volume of treated air has been reached and the adsorbent is saturated, the lithium-exchanged X-zeolite bed 16 may be regenerated by temperature swing desorption, pressure swing desorption or a combination of both. The desorbed carbon dioxide may be then be disposed of. It will be appreciated that in applications in space, the carbon dioxide may be released outside the spacecraft or station. In temperature swing desorption, the temperature of adsorbent bed 16 may be raised above operating temperature (i.e. ambient temperature) to a temperature at which the carbon dioxide is driven from the adsorbent. The temperature for regeneration of the lithium-exchanged X-zeolite bed 16 may be, but not limited to, from about 50° C. to about 100° C. The maximum temperature may be determined by the thermal stability of the adsorbent. For example, zeolites begin to decompose at temperatures of about 400° C.

Alternatively, adsorbent bed 16 may be regenerated by pressure swing desorption. To regenerate adsorbent bed 16 by pressure swing desorption, the pressure of adsorbent bed 16 may be decreased to a pressure range where the carbon dioxide is forced from the adsorbent. The pressure range for regeneration of the lithium-exchanged X-zeolite bed 16 may be from about 1 torr to about $10^{-6}$ torr (FIGS. 2 and 4). The isotherms of FIGS. 2 and 4 may also be used to show the reduced capacity of the lithium-exchanged X-zeolite bed 16 at lower partial pressures. It should be noted that the isotherms of FIGS. 1 and 4 are at 22° C. and that at higher temperatures the isotherms may shift to the right and the capacity of the lithium-exchanged X-zeolite bed 16 may be significantly lower. It will be appreciated that in applications in space, the adsorbent bed 16 may be exposed to the space atmosphere through an exhaust pipe, for example, such that the lower limit of the pressure during pressure swing desorption may be the atmospheric space pressure, i.e. about $10^{-8}$ torr. The desorbed carbon dioxide may also be disposed of through the same pipe.

Regeneration of the adsorbent bed 16 may also be accomplished by using a combination of temperature swing and pressure swing. Temperature swing desorption may take less time for regeneration, but it may also require larger energy input. By combining the desorption processes, short regeneration times with a minimal energy output may be realized. For regeneration of the lithium-exchanged X-zeolite bed 16 by a combination of temperature and pressure swing desorption, the temperature may be from about 50° C. to about 100° C. and the pressure from about 1 torr to about $10^{-6}$ torr.

In process 10, air 12 may be fed through desiccant bed 14 before being fed through adsorbent bed 16. Examples of desiccants used in desiccant bed 14 may be, but not limited to X and Y faujasites, especially including sodium X faujasite, A zeolites, and silica gel. The desiccant bed 14 may remove extra moisture in the air. Excess water in the air may poison the adsorbent and removing it from the air before passing it over the adsorbent bed 16 may prolong the life of the adsorbent. Additionally, the partial pressure of water vapor in exhaled air is 47 torr compared to 5 torr in inhaled air. Therefore, it may be desirable to remove extra water vapor as well as carbon dioxide. Desiccant bed 14 may also be regenerated using temperature swing desorption and/or pressure swing desorption.

Figure 5:
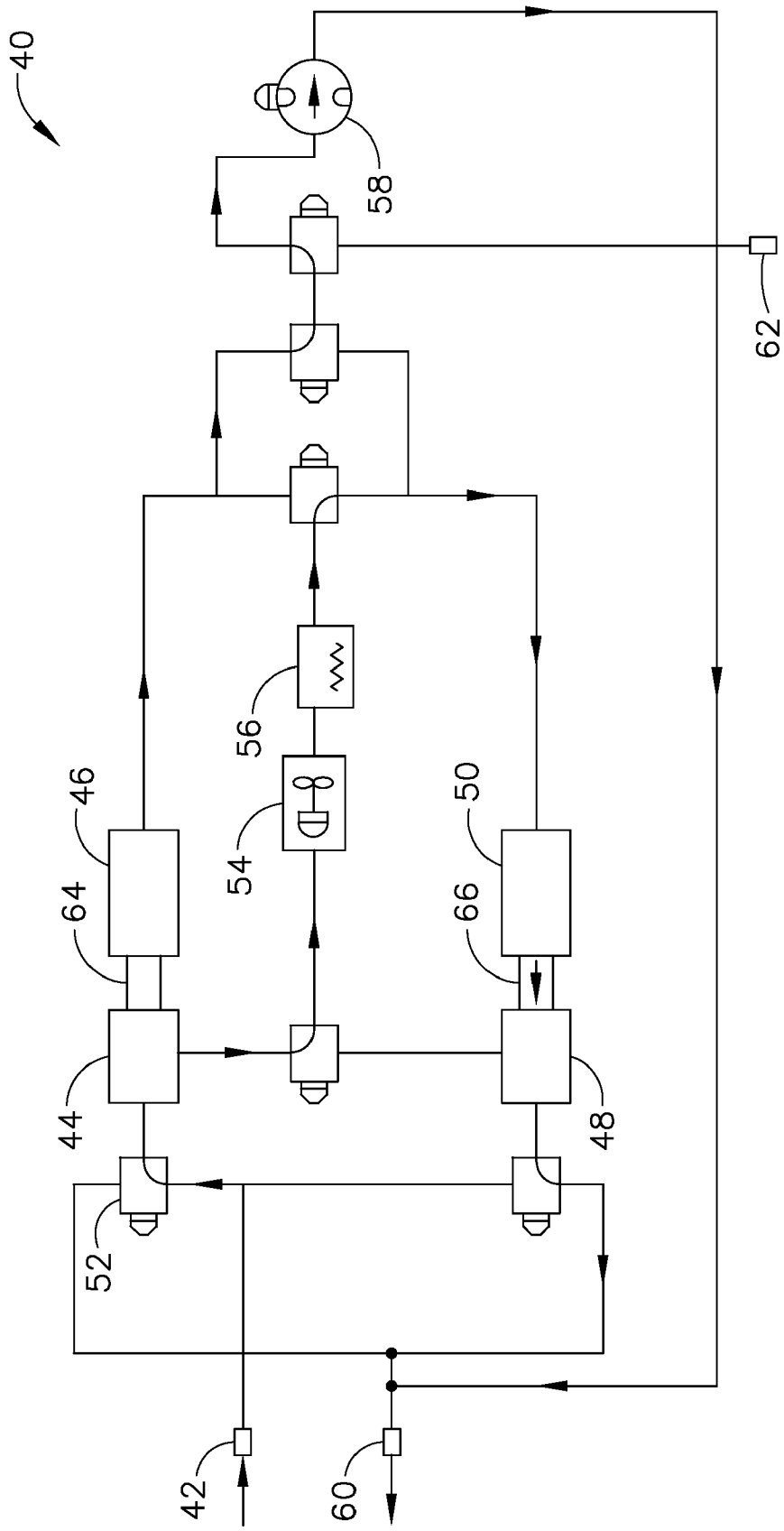
FIG. 5 is a schematic of an example of a carbon dioxide removal assembly, according to the present invention.

An example of a carbon dioxide removal assembly (CDRA) 40 used for carrying out process 10 of the present invention is shown schematically in FIG. 5. CDRA 40 utilizes four beds that operate cyclically between adsorption and regeneration modes. The four beds may include a first 44 and a second 48 desiccant bed and a first 46 and second 50 carbon dioxide adsorbent bed. Having two desiccant and adsorbent beds may allow for one set to be operating for removal of carbon dioxide and water vapor while the other set is being regenerated, allowing for continuous use of CDRA 40. For example, one desiccant bed may be regenerated and dry whereas the second is water saturated. Likewise, one of the adsorbent beds may be regenerated while the second may be saturated with carbon dioxide.

With respect to CDRA 40 operation, air may be drawn into air inlet 42 and first selector valve 52 may feed the air to first desiccant bed 44, where the water vapor may be selectively removed, thereby protecting the downstream carbon dioxide adsorption bed from water poisoning. Next, this dry air may be directed to the carbon dioxide adsorbent bed that is regenerated, shown as second carbon dioxide adsorbent bed 50 in FIG. 5, where the carbon dioxide may be selectively removed. This dry, carbon dioxide free air may then flow through a saturated desiccant bed, represented in FIG. 5 by second desiccant bed 48, where the air stream is re-humidified, and may then be directed back to the cabin through air return 60. As these processes occur, the saturated carbon dioxide adsorbent bed, i.e. first carbon dioxide adsorbent bed 46, may be regenerated using pressure swing/thermal swing methodology, venting the carbon dioxide overboard to space through exhaust 62. It will be appreciated that as first desiccant bed 44 and second carbon dioxide adsorbent bed 50 become saturated, second desiccant bed 48 and first adsorbent bed 46 may be regenerated. At this point the air stream may be redirected such that it now flows through regenerated second desiccant bed 48 and first carbon dioxide adsorbent bed 46 to remove water and carbon dioxide while the remaining two beds may now be regenerated.

CDRA 40 may further comprise a blower 54 for moving the air through the system and precooler 56 for precooling the air before it is fed to either first 46 or second 50 adsorbent bed. Precooling of the air aids in the adsorption of carbon dioxide to the adsorbent. Any adsorption may be accompanied by a heat of sorption, which may heat the product air, perhaps to the point of discomfort. Cooling the air may both reduce the product air temperature and improve adsorbent capacity. A pump 58 may be used for providing a vacuum for regeneration of the desiccant and adsorbent beds. First air check valve 64 and second air check valve 66 may be used to assure that the air progresses through the system even when a vacuum is present. Outlet 62 may provide for a connection between CDRA 40 and space, thus providing a natural vacuum and an exhaust for desorbed carbon dioxide. Carbon dioxide depleted air is then pumped back into the space station through air return 60.

It should be understood, of course, that the foregoing relates to exemplary embodiments of the invention and that modifications may be made without departing from the spirit and scope of the invention as set forth in the following claims.

We claim:

1. A process for removing carbon dioxide from a gas comprising the steps of:

feeding a stream of gas through an adsorbent bed at a carbon dioxide partial pressure of less than about 10 torr;

adsorbing carbon dioxide from the gas stream to yield a carbon-dioxide depleted gas, the adsorbent bed comprising a lithium-exchanged X-zeolite; and regenerating the adsorbent bed, after it is substantially saturated, with a pressure swing desorption from about $1\times10^{-6}$ torr to about 1 torr.

2. The process of claim 1 wherein the partial pressure is less than about 1 torr.

3. The process of claim 1 wherein the lithium-exchanged X-zeolite comprises lithium-exchanged X-zeolite beads.

4. The process of claim 1 wherein the lithium-exchanged X-zeolite comprises a lithium-exchanged X-zeolite polymer composite.

5. The process of claim 1 wherein the stream of gas is fed through the adsorbent bed at a linear velocity of from about 1.95 cm/sec to about 7.80 cm/sec.

6. The process of claim 1 further comprising the step of feeding the gas through a desiccant bed prior to feeding the gas through the adsorbent bed.

7. The process of claim 1 wherein the adsorbent bed is regenerated by a combination of pressure swing desorption and temperature swing desorption.

8. The process of claim 1 wherein the gas is exhaled air and the carbon-dioxide depleted gas is used as inhaled air.

9. A process for removing carbon dioxide from air comprising the steps of:

feeding a stream of air, at approximately ambient pressure, through an adsorbent bed at a carbon dioxide partial pressure from about 0.1 torr to 1 torr to yield a carbon dioxide depleted gas, the adsorbent bed comprising a lithium-exchanged X-zeolite; and regenerating the adsorbent bed when it is saturated.

10. The process of claim 9 further comprising the step of feeding the air through a desiccant bed prior to feeding the air through the adsorbent bed.

11. The process of claim 9 wherein the lithium-exchanged X-zeolite comprises a lithium-exchanged X-zeolite polymer composite.

12. The process of claim 9 wherein the adsorbent bed is regenerated by a combination of temperature swing desorption and pressure swing desorption.

13. The process of claim 12 wherein the temperature swing desorption is from about 50° C. to about 100° C.

14. The process of claim 12 wherein the pressure swing desorption is from about $1\times10^{-6}$ torr to about 1 torr.

15. The process of claim 9 wherein the step of regenerating the adsorbent bed when it is saturated comprises exposing the adsorbent bed to outer-space.

16. The process of claim 9 wherein the air is exhaled air.

17. A process for removing carbon dioxide from air comprising the steps of:

feeding the air through a desiccant bed to yield a dry air;

feeding the air through an adsorbent bed at a carbon-dioxide partial pressure of from about 0.1 torr to about 1 torr to yield carbon dioxide depleted air, the adsorbent bed comprising a lithium-exchanged X-zeolite; and regenerating the adsorbent bed, after it is substantially saturated, with a pressure swing desorption from about $1\times10^{-6}$ torr to about 1 torr.

* * * * *

UNITED STATES PATENT AND TRADEMARK OFFICE
CERTIFICATE OF CORRECTION

PATENT NO. : 7,608,133 B2  Page 1 of 1
APPLICATION NO. : 11/383589
DATED : October 27, 2009
INVENTOR(S) : Yates et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Twelfth Day of October, 2010

David J. Kappos
*Director of the United States Patent and Trademark Office*